Dec. 1, 1925.

R. JOHNSON 1,563,712

BEARING GRINDING MACHINE

Filed May 10, 1924    2 Sheets-Sheet 1

Inventor
Ralph Johnson

By
Attorney

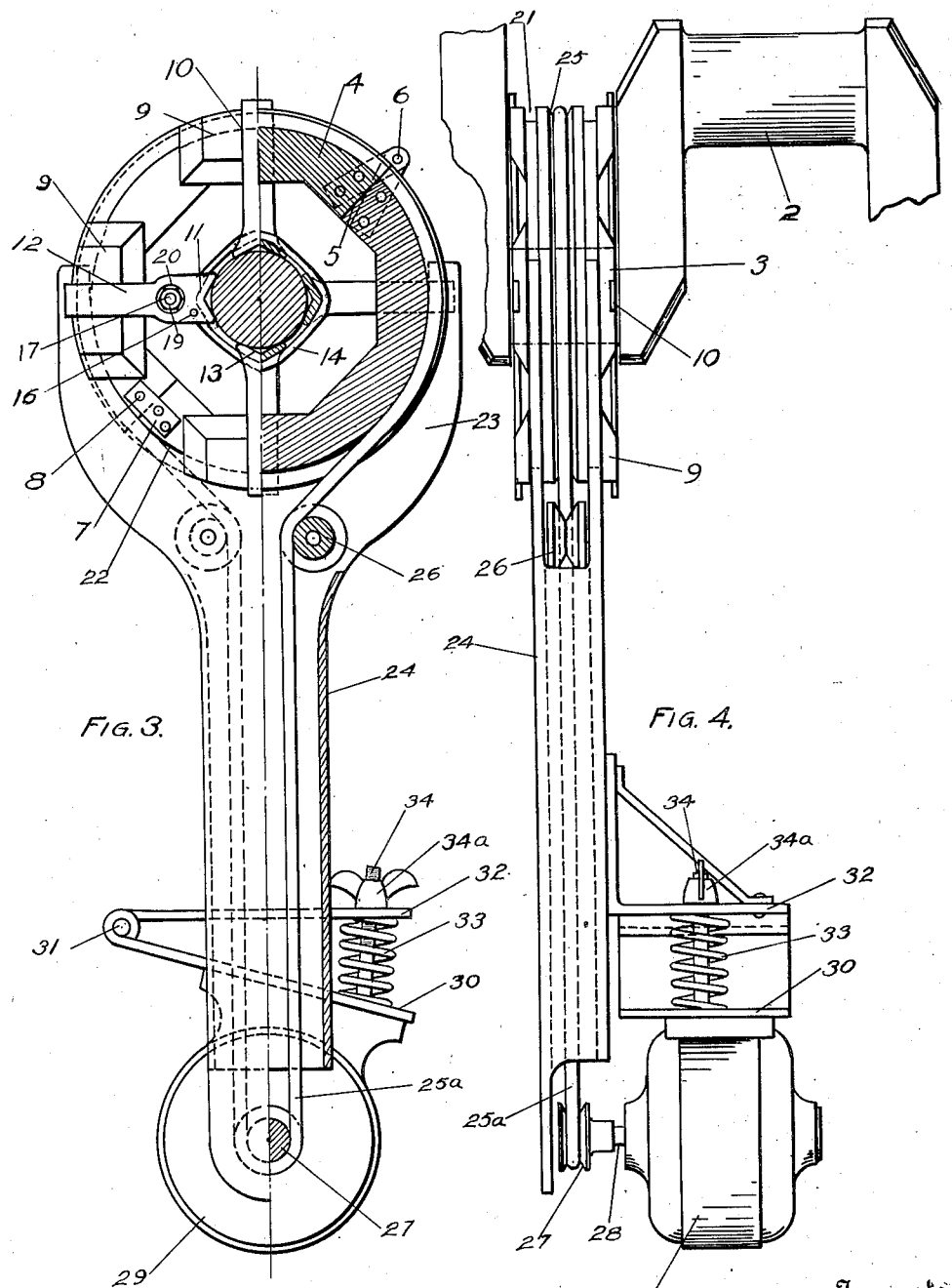

Patented Dec. 1, 1925.

1,563,712

UNITED STATES PATENT OFFICE.

RALPH JOHNSON, OF RIPLEY TOWNSHIP, CHAUTAUQUA COUNTY, NEW YORK.

BEARING-GRINDING MACHINE.

Application filed May 10, 1924. Serial No. 712,354.

*To all whom it may concern:*

Be it known that I, RALPH JOHNSON, a citizen of the United States, residing in Ripley Township, in the county of Chautauqua and State of New York, have invented new and useful Improvements in Bearing-Grinding Machines, of which the following is a specification.

This invention is particularly designed to grind bearings in place such as crank bearings on automobiles. Such bearings ordinarily wear out of round and it is desirable to repair them without taking down the engine. Features and details of the invention will appear from the specification and claims.

The invention is illustrated in the accompanying drawings as follows:—

Figure 1:
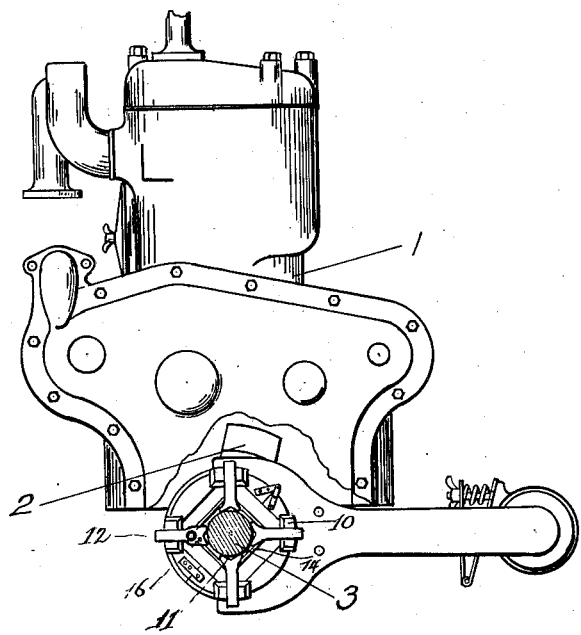

Fig. 1 shows a side elevation of an engine with the device in place for operation.

Figure 2:
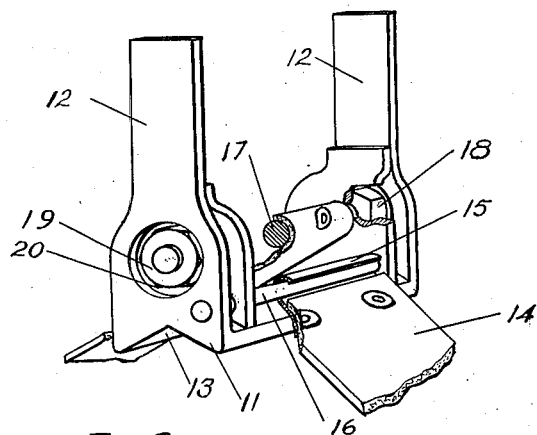

Fig. 2 a perspective view of one of the grinding shoes.

Fig. 3 an enlarged side elevation of the device, a part being in section.

Fig. 4 a plan view of the device.

1 marks the engine, 2 the crank shaft and 3 one of the crank pins. In Fig. 1 the crank case is removed exposing the crank. This is all that is necessary to prepare the engine for grinding.

4 marks the rotating head split on the line 5 and hinged at 6 by hinge plates arranged at each side of the head. The head is closed and locked in closed position by straps 7, which are secured to one side of the head and secured to the other by a pin 8. By removing the pin 8 the head may be opened, placed over a crank and closed and locked by the pin.

Guide blocks 9 are arranged on the sides of the head. Radial guide slots 10 are arranged in these blocks. V-shaped grinding shoes 11 have the radial projections 12 which extend into the slots 10. The shoes are the full width of the device so as to operate on a crank pin and permit the balancing of the head to clear the arms of the crank. The shoes have the grinding surfaces 13 which ordinarily are near the edges of the shoes and consequently bridge any flat portions that may occur in the pin being ground so as to assure the grinding of approximate cylindrical surfaces.

A tightening strap 14 extends around the shoes 11 between the projections 12. It has a hook 15 at one end by which it may be detachably secured to a pin 16. By disengaging this hook the tightening strap may be opened to permit the placing of the head on the crank pin and after it is in place the hook is re-engaged. The opposite end of the strap is secured to a pin 17. This pin is journaled in the projections 12 and has a head 18 at one end and a nut 19 at the opposite end, the head and nut being set in countersunk sockets 20 so as to clear the crank arms. By loosening the nut 19 turning the pin so as to tighten the strap radial pressure is exerted on the shoes and the strap may be locked in this adjustment by setting up the nut 19. The strap has sufficient elasticity to follow up the grinding operation.

Bearing grooves 21 are arranged in the periphery of the head and operate in a bearing surface 22 in a forked end 23 of a hollow frame 24. The head has a belt groove 25 on which operates a belt 25$^a$. The belt is carried around guide pulleys 26 and extends through the frame 24 to a drive pulley 27. The drive pulley 27 is mounted on the rotor shaft 28 of an electric motor 29. The motor 29 is mounted on a swinging plate 30 hinged at 31. The hinge 31 is mounted on a bracket 32. A spring 33 forces the plate 30 outwardly so as to put tension on the belt 25$^a$ and the spring may be contracted and held in place by a bolt 34 having a wing nut 34$^a$.

With this device after it is put in place as described the motor is set in motion and the head is rotated rapidly. A grinding material is applied to the surface and the surface is ground to finish the crank pin. In this way the cranks may be repaired in less time than it would take to remove the crank shaft and an approximately true cylindrical surface formed.

What I claim as new is:—

1. In a bearing grinding machine, the combination of a split rotating head having radially extending guides; grinding shoes mounted in the head, said shoes having radial projections operating on said guides; and means driving the head.

2. In a bearing grinding machine, the combination of a split rotating head having slots on each face thereof; grinding shoes mounted in the head having projections at each end of the shoe extending into said slots; and means for driving the head.

3. In a bearing grinding machine, the combination of a split rotating head having radial slots in the face thereof; grinding shoes having projections extending into the slots; and a tightener for said shoes adjustably secured to one of the shoes and passed around the other shoes.

4. In a bearing grinding machine, the combination of a split rotating head having radial slots in the face thereof; grinding shoes having projections extending into the slots; and a tightener for said shoes having one of its ends detachably secured to one of the shoes and passed around the other shoes for tightening the same.

5. In a bearing grinding machine, the combination of a split rotating head having radial slots in the face thereof; grinding shoes having projections extending into the slots; and a tightener for said shoes having one of its ends detachably secured to one of the shoes and its opposite end adjustably secured to said shoe, said tightener being passed around the other shoes for tightening the shoes.

6. In a bearing grinding machine, the combination of a split rotating head having a bearing surface thereon; a frame in which the head is mounted, said frame having a hollow handle; a belt operating on the head and extending through the hollow handle; a motor mounted on the frame driving the belt; grinding shoes mounted in the head; and means for exerting pressure on the shoes.

In testimony whereof I have hereunto set my hand.

RALPH JOHNSON.